United States Patent
Alling et al.

[11] Patent Number: 6,102,580
[45] Date of Patent: Aug. 15, 2000

[54] AXIAL-THRUST BEARING WITH IMPROVED LUBRICANT FLOW

[75] Inventors: Richard L. Alling; Curtis H. Perkins, both of Torrington; Stephen T. Podhajecki, Norfolk, all of Conn.

[73] Assignee: The Torrington Company, Torrington, Conn.

[21] Appl. No.: 09/286,398

[22] Filed: Apr. 5, 1999

[51] Int. Cl.[7] .......................... F16C 19/30; F16C 19/00
[52] U.S. Cl. ....................... 384/618; 384/470; 384/607
[58] Field of Search .................................. 384/470, 607, 384/606, 618, 621, 623

[56] References Cited

U.S. PATENT DOCUMENTS

| | | | |
|---|---|---|---|
| 3,350,149 | 10/1967 | Oechsler | 308/217 |
| 3,414,342 | 12/1968 | Root | 384/470 |
| 3,685,114 | 8/1972 | Vannest | 29/148.4 C |
| 3,876,267 | 4/1975 | Schaeffler et al. | 384/470 |
| 3,913,994 | 10/1975 | Alling et al. | 384/470 |
| 4,077,683 | 3/1978 | Bhateja et al. | 308/235 |
| 4,854,745 | 8/1989 | Kaminmura et al. | 384/607 X |
| 4,874,260 | 10/1989 | Podhajecki | 384/470 |
| 5,328,277 | 7/1994 | Moulton | 384/572 |
| 5,575,733 | 11/1996 | Machida et al. | 476/40 |
| 5,584,585 | 12/1996 | Premiski et al. | 384/607 |
| 5,630,670 | 5/1997 | Griffin et al. | 384/606 |
| 5,879,086 | 3/1999 | Muntnich et al. | 384/621 |
| 5,927,868 | 7/1999 | Critchley et al. | 384/606 |
| 5,938,349 | 12/1968 | Ogawa | 384/621 X |

*Primary Examiner*—David A. Bucci
*Assistant Examiner*—Colby Hansen
*Attorney, Agent, or Firm*—Robert F. Palermo

[57] ABSTRACT

A roller cage for an axial-thrust bearing in a rotating machine has a substantially flat annular body with a first face, a second face, a radially inner surface, a radially outer surface, and a plurality of radially-arrayed substantially rectangular roller pockets with axially oriented sidewalls and endwalls. The cage also has features which provide enhanced flow of lubricant, present within the rotating machine, through the radially arrayed roller pockets during operation of the rotating machine. Rollers are retained within the pockets by a single projection on the sidewall of each pocket at the first face and another single projection on the other sidewall at the second face. Cage design in conjunction with inner and outer race design assures direction of lubricant flow to locations with greatest lubrication and cooling requirements. Because of its simple straight-surface design the cage of the invention is relatively simple to fabricate from polymers by polymer molding processes or from metals by fine flow blanking or ribbon forming and coining techniques.

9 Claims, 4 Drawing Sheets

AXIAL-THRUST BEARING WITH IMPROVED LUBRICANT FLOW

BACKGROUND OF THE INVENTION

This invention relates generally to axial-thrust bearings and more particularly to high performance thrust roller bearings which provide enhanced removal of frictional heat and replenishment of a lubricant film by assuring lubricant flow through the bearings to other components of a rotating machine.

In automotive transmission units as well as in other high-speed rotary machines, lubricant circulation is the primary mechanism for dissipation of frictional heat. The rollers are aligned on the radii of the bearing, and the sidewalls of the pockets are offset but parallel to the radii. The rollers, being narrower than the pockets are slightly loose within the pockets, and while driving the cage during acceleration and being driven by the cage during deceleration, the rollers tend to contact the sidewalls at the outer end rather than along the full length of the roller. This results in almost point contact between the outer end of the rollers and rectangular roller pockets of the roller cage at the outer ends of the roller pockets and leads to increased local heat generation and wear of the cage and rollers. Apart from that, the sliding local contact between the rollers, the cage, and the races produces frictional heat and, in cases of inadequate lubricant flow, can generate temperatures sufficient to degrade seals, lubricants, and friction linings. This may result in constriction of fluid paths due to accretion of wear particles and lubricant breakdown products, accelerated wear of moving components due to further decrease of already inadequate lubricant flow, and increased rates of frictional heat generation. Since much of the lubrication of components mounted radially outboard of the thrust bearing relies on lubricant which must pass through the bearing, any factor which impedes such flow or degrades its effectiveness is potentially catastrophic to the life of the transmission. Moreover, there is a tendency for lubricant to follow the path of least resistance through the bearing, thereby contributing to lubricant starvation of other critical areas of the bearing. Thus, lubricant, in order to provide the maximum protection, must be directed away from paths of least resistance and into those parts of the bearing which carry the greatest load and which generate the greatest frictional heat effects. For applications requiring higher power density, higher rotational speeds, and increased roller loading, it is important to minimize or to completely avoid the above lubrication inadequacies.

The foregoing illustrates limitations known to exist in present high performance roller thrust bearings for use in rotating machines. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by a roller cage for an axial-thrust bearing in a rotating machine, comprising a substantially flat annular body having a first face, a second face, a radially inner surface, and a radially outer surface; a plurality of radially-arrayed substantially rectangular roller pockets with axially oriented sidewalls and endwalls; and means for directing a flow of lubricant through the radially arrayed roller pockets during operation of the rotating machine.

The foregoing and other aspects will become apparent from the following detailed description of the invention when considered in conjunction with the accompanying drawings.

DETAILED DESCRIPTION

Figure 1:
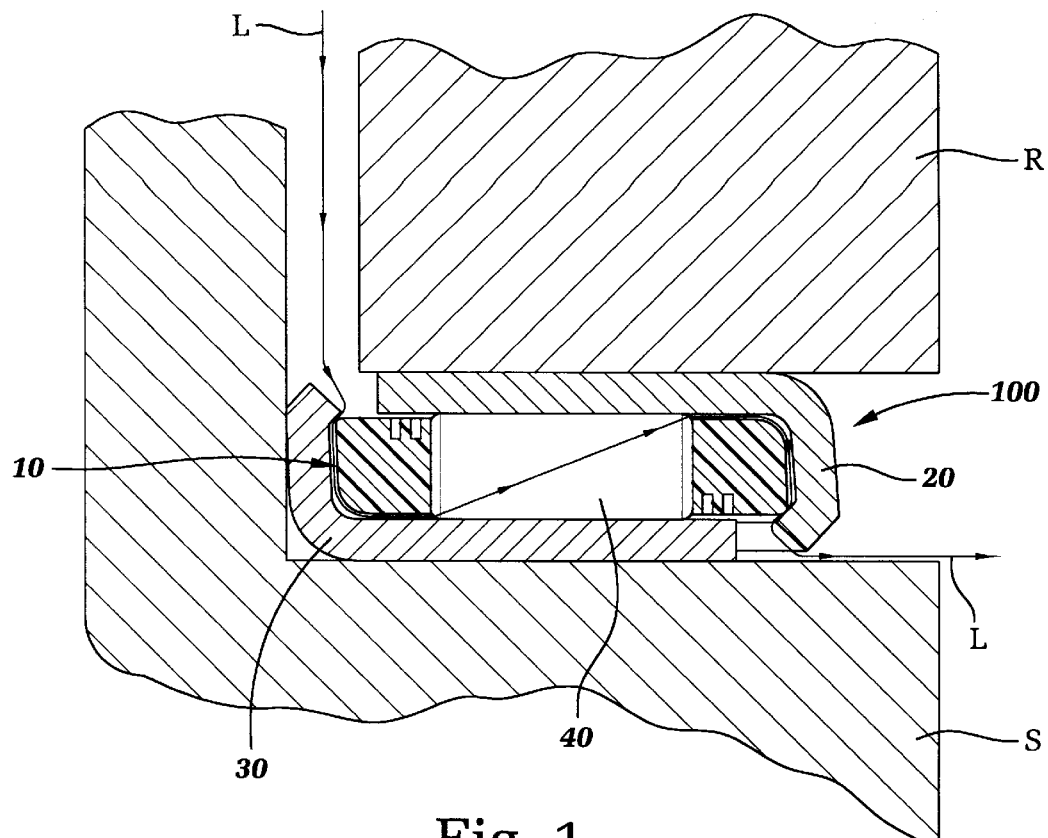
FIG. 1 is a schematic elevation sectional view showing the enhanced path of lubricant through a roller thrust bearing of the invention in a rotating machine.

Briefly, the thrust bearing assembly 100 illustrated in FIGS. 1, 2, 5, and 6 consists of an annular outer race 20 with a flat radially projecting member and a cylindrical outer wall, an annular inner race 30 with a flat radially projecting member and a cylindrical inner wall, an annular roller cage 10, and cylindrical rollers 40. The roller cage 10 has an inner rail 12, an outer rail 11, and a plurality of substantially rectangular roller pockets 15. The size and number of pockets 15 and rollers 40 depends on the size and load capacity of the bearing 100. The roller diameters are sufficient to support the inner race 30 and outer race 20 clear of the cage 10 during operation. The clearance between the races and cage is sufficient to permit passage of a thin film of lubricant over and through the cage 10 to provide lubrication to the rollers 40 and the races 20, 30, and to remove frictional heat from the assembly. This lube flow may be driven solely by centrifugal force if the lubricant is supplied at the center of the device; however, in order to assure flow through other than paths of least resistance, this invention includes a roller cage with features for controlling and directing lubricant flow. Note that "up" and "down" are used herein only to describe directions with respect to the figures shown. They are not intended to represent absolute directions nor to indicate any required orientation of the bearing in its applications.

Figure 2:
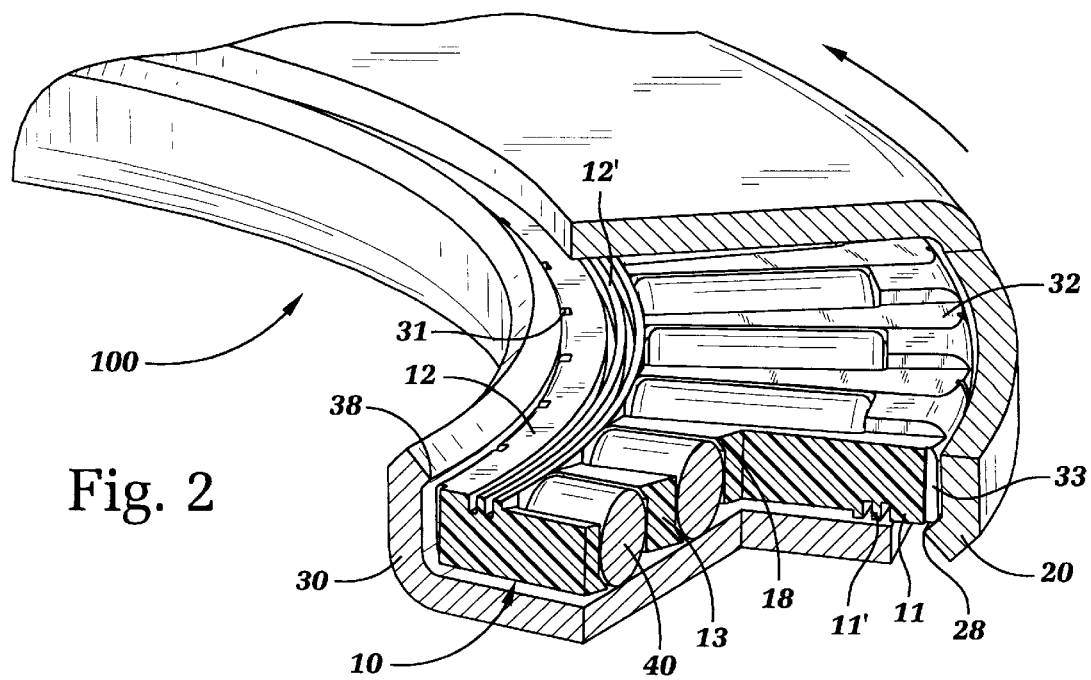
FIG. 2 is a schematic partially sectional perspective view of a portion of a roller thrust bearing of the invention.

FIG. 1 shows a longitudinal section taken through a roller pocket of a roller thrust bearing 100 of the invention installed in a rotating machine, and FIG. 2 shows a partially sectional perspective view of the bearing 100. The bearing is shown with its outer race 20 supporting a rotating member "R" and resting on its inner race 30 on a stationary member "S" of the machine. The roller 40 supports the outer race 20 above the inner race 30 with sufficient clearance for the roller cage 10, supported by and supporting a film of lubricant between the cage and the races, to be free of both races. Lubricant flow "L" is downward between the inner wall of inner race 30 and the inner surface of the cage 10, under the inner rail 12 at the recesses 32 of the first face A (FIGS. 2 and 3), axially through the roller pocket 15 around the roller 40, over the outer rail 11 at the recesses 32 of the second face B and downward between the outer surface of the cage 10 and the cylindrical outer wall of the outer race 20. Preferably there is a slight axial taper of the inner and outer surfaces of the cage 10 to conform to a similar slight taper of the cylindrical inner and outer walls of the inner race and outer race, respectively. This taper increases radial pilot contact areas between the cage and races during radial runout to reduce stress and minimize cage-to-race pilot zone wear. Moreover, during transmission of radial runout load through the thrust bearing assembly, the matching tapers cause slight coning (or dishing) of the cage 10. This causes the inner and outer rails to ride in close proximity to the races.

Inner rail 12 and outer rail 11 have seal portions on opposite faces (second and first faces, respectively) of the cage 10 comprising labyrinthine dams 12' and 11', respectively, which consist of a plurality of circumferential sharp-edged grooves, which, in radial cross-section, may have a crenellated appearance, as shown, a sawtooth form, or other flow-impeding cross section. These seal portions provide a resistance to radial flow of lubricant across them when the rotating machine is operating due to their close fit to the races 20, 30 and to their multiple grooves, which induce tangential flow of lubricant and discourage radial flow. This directs the flow axially between the axial portions of the inner race 30 and the outer race 20 and the inner and outer surfaces of the roller cage 10 to prevent lubricant starvation of critical areas of the bearing. This enhances sealing and promotes lube flow into the corners of the races 20, 30 between the cylindrical axially oriented walls and the radial annular surfaces of the races. Such enhanced lube flow through the more heavily stressed cage-to-race pilot contact zones helps to flush dirt and wear particles out of these critical areas while also extracting friction-generated heat from the bearing.

Figure 3A:
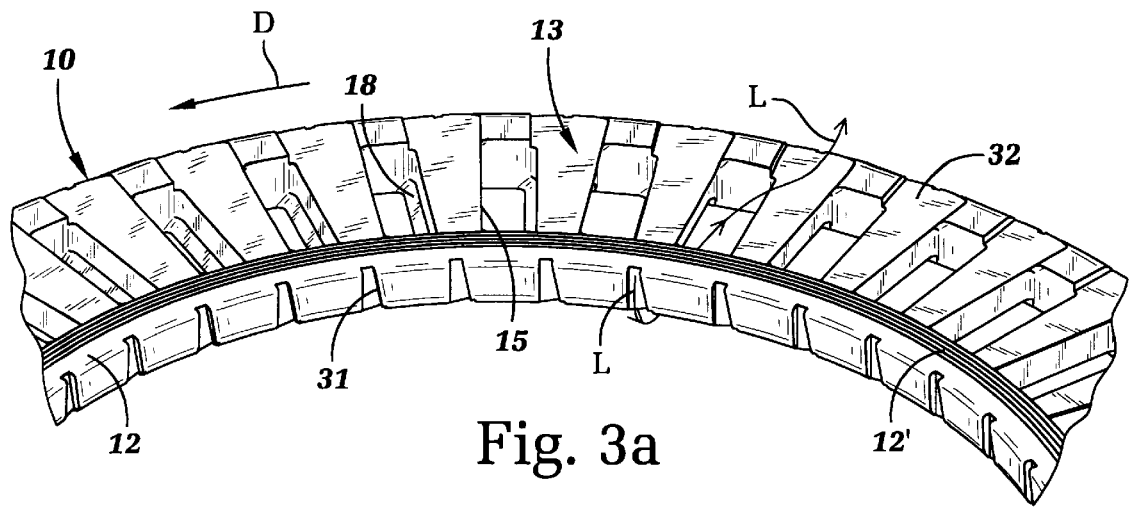
FIGS. 3a and 3b are schematic fragmentary perspective views of a roller cage of the invention from inner and outer vantage points, respectively.
Figure 3B:
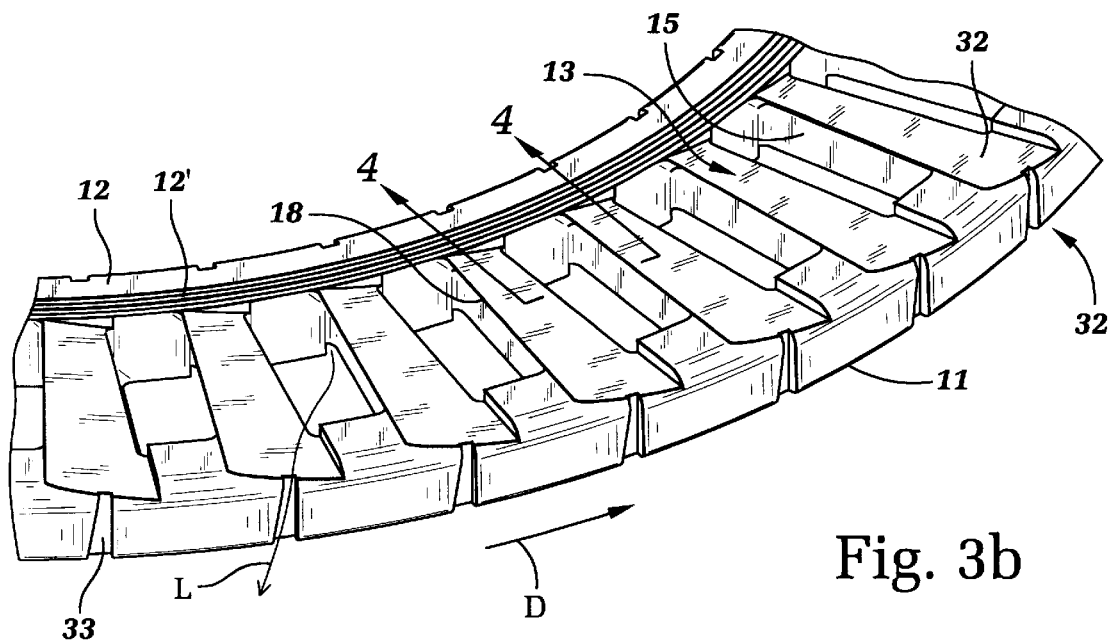

FIGS. 3a and 3b. show perspective views from the inner edge and the outer edge, respectively, of a portion of a roller cage 10, according to the invention, which is designed to impel, control, and direct lubricant flow. The cage 10 has a radially inner surface and a radially outer surface, an inner rail 12, an outer rail 11, radial roller pockets 15 with unique roller retainer vanes 18, and solid portions 13 between the pockets 15. The retainer vanes 18 have the dual purposes of retaining rollers 40 in the pockets 15 and of axially pumping lubricant, in the example shown in FIG. 2, from the inner race 30 to the outer race 20. The upper faces of the solid portions 13 of the cage are slightly inclined upward from the trailing unvaned edge of one pocket which is lower than the inner and outer rails 12, 11, to the trailing distal edge of the retainer vanes 18, of substantially equal height with the rails, of the trailing pocket. On the bottom faces of solid portions 13, the incline is also upward from the leading distal edge of the retainer vane 18 to the leading unvaned edge of the trailing pocket 15. Thus, even if the inner and outer races 30, 20 were resting directly on the rails, they would not be in contact with the solid portions 13.

The cage 10 also has notches 31 on its inner radial surface, and other notches 33 on its outer radial surface. These notches 31, 33 also have at least one inclined edge and intersect approximately with the centers of the recesses 32 ahead of the race/roller contact zones of the trailing pockets. The recesses 32 are substantially contiguous with the tilted surfaces of the solid portions 13 at opposite faces of the roller cage. The inclined edges of the notches 31 in FIG. 3a act as vanes to pump the lubricant axially downward as indicated by the lube flow path "L", and the inclined edges of notches 33 in FIG. 3b also pump the lubricant axially downward as shown. In both cases, the pumping action requires rotation in the direction "D" shown. Thus, acting with the retainer vanes 18, the notches create a serpentine flow around the cage and through the roller pockets. Because of the directional design of the notches 31, lubricant arriving at the inner surface of the cage 10 is pumped axially downward and passes under the recesses 32 of the inner rail 12 at the first face. It flows radially outwardly to the solid portion 13 and into the trailing roller pockets 15. The lubricant in the pockets 15 is lifted by the retainer vanes 18 to the second face and exits over the unvaned trailing edges of the pockets via the solid portions 13. The upward tilt of the solid portions 13 toward the tip of the vanes provides a squeegee effect to the lubricant spreading it along the radial portion of the outer race 20 and causing it to flow over the recesses 32 of the outer rail 11, at the second face of the cage 10, to the outer surface of the cage 10, as seen in FIGS. 3a and 3b. The notches 33 then pump the lubricant axially down the outer surface of the cage to the gap between the outer wall of the outer race 20 and the radial portion of the inner race 30. If necessary, under certain operating conditions, the lubricant can be pumped to flow radially inwardly from the outer surface through the pockets to the inner surface, by forming the sweep of the recesses 32 and the inclination of the solid portions 13 in the appropriate direction with respect to the direction of rotation. This is determined by the operating speed of the bearing and whether the lubricant source lies outboard of the bearing and above or below the bearing. In either case, the enhanced lubricant flow through the bearing improves lubrication of outboard or inboard components, reduces friction and wear, and carries away frictional heat.

The invention is designed to assure that a flow of lubricant passes between the axial cylindrical wall of one race and the proximal radial surface of the cage impelled by slanted edges of notches on the cage face, the notches being aligned with the approximate centers of solid portions of the cage between the roller pockets. From there, it crosses a rail of the cage at a recess and flows against one solid portion into a trailing roller pocket 15 ahead of the roller 40. After the roller passes, the lubricant is impelled axially through the pocket 15 by the retainer vane and onto the trailing solid portion where it is propelled by the squeegee action of the trailing retainer vane 18 to cross a rail of the cage at a recess substantially contiguous with the solid portion 13. From there, it is pumped, by an inclined edge of a notch on a radial surface of the cage, between that surface and the axial cylindrical wall of the other race to exit the bearing.

Figure 4:
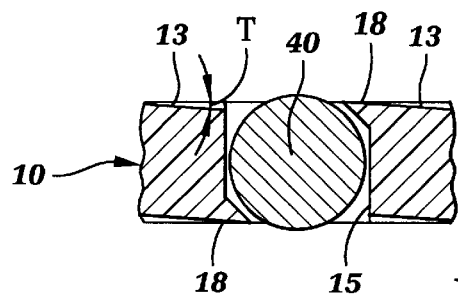
FIG. 4 is a schematic transverse elevation sectional view through a roller and roller pocket, along line 4—4 of FIG. 3, illustrating inclined solid portions together with roller retention and axial pumping features of a preferred embodiment of the roller cage.

FIG. 4 shows a cross-section through a roller 40 and roller pocket 15 in a preferred embodiment of the cage 10. In this embodiment, roller retention in the pocket 15 is provided by at least one retainer vane 18 at each face on diagonally opposite edges of the pocket 15. The retainer vanes 18 may or may not extend the full length of the pocket between the endwalls thereof; and, because of their shape, act as axial pumping vanes through the pocket 15 for lubricant flowing between the races and the cage 10 to further enhance flow. In addition, as alluded to above, the solid portions 13 between the roller pockets 15 are formed with a slight tilt "T" from the tip of the retainer vanes 18 back to the unvaned edge of the trailing pocket to assure a supply of lubricant to the roller in the trailing pocket and to the sharp edges of the retainer vanes. A low-angle tilt of the solid portions 13 has been found to be adequate for most applications.

Figure 5:
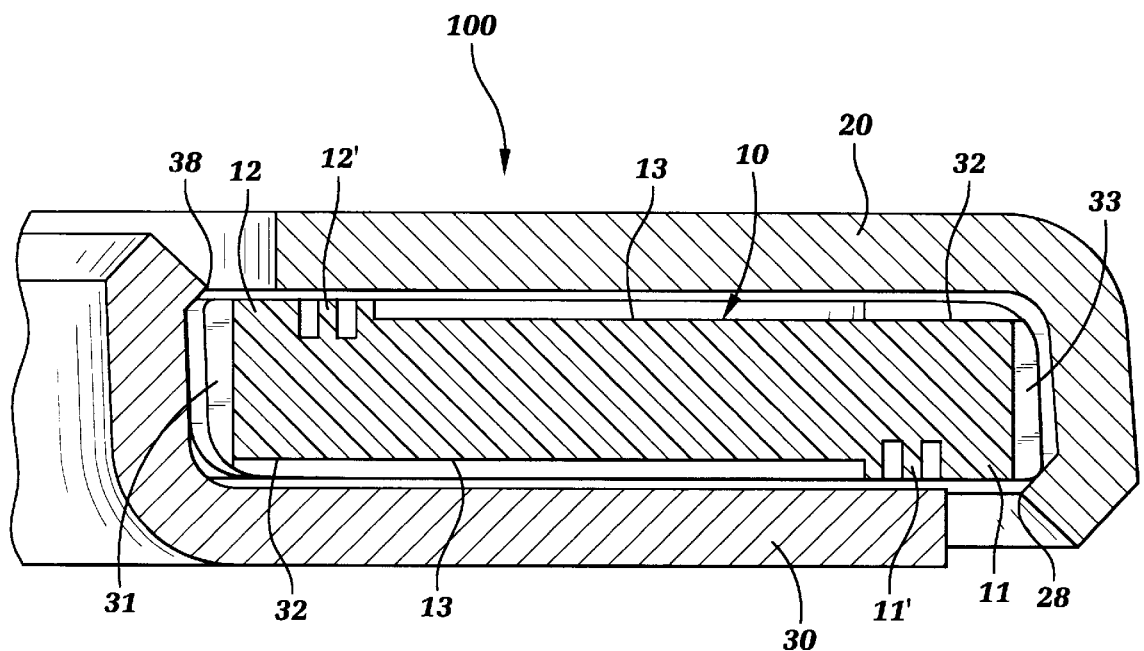
FIG. 5 is a fragmentary radial sectional view through a roller bearing of the invention at a midpoint of a solid portion between two roller pockets of the roller cage.
Figure 6:
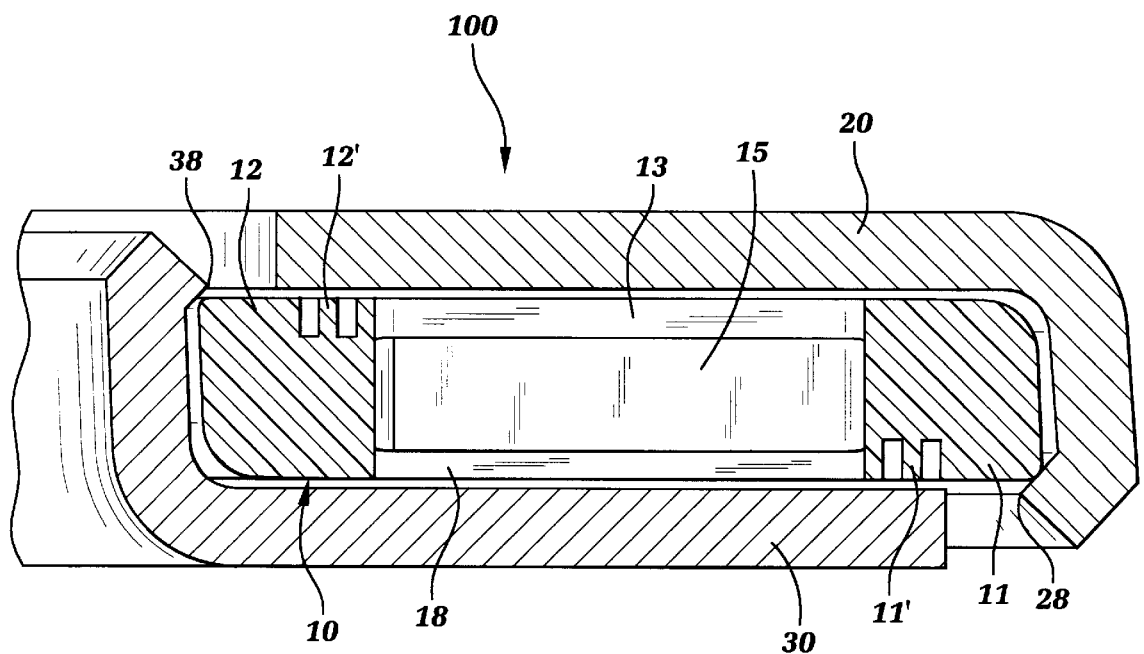
FIG. 6 is a fragmentary radial sectional view through a roller bearing of the invention at a midpoint of a roller pocket, without a roller, of the roller cage.

As seen in FIGS. 2, 5, and 6, inner race 30 has an outwardly projecting edge 38 on its inner cylindrical wall and outer race 20 has a similar inwardly projecting edge 28 on its outer cylindrical wall. The radius of edge 38 of the inner race 30 is slightly larger than the inner radius of the roller cage 10, so that it snaps in place when the cage 10 is forced over it. Similarly, the radius of edge 28 of the outer race 20 is slightly less than the outer radius of the cage 10 to also snap in place when forced over the cage. The inner edge of the cage has a slight radius on one face, and the outer edge of the cage has a slight radius on the opposite face, to permit this assembly and to provide a near sharp corner retention of the cage within the races once the races are snapped in place. This one-way snap fit simplifies handling in that it eliminates the danger of disorientation of the cage 10 within the races 20, 30 when the cage and rollers are assembled within the races. The single face radii and opposed sharp edges at the inner and outer surfaces of the cage provide both tactile and visual indications of the cage orientation. This is important; because the pumping action of the cages is specific to the direction of rotation. The necessity for proper orientation is well recognized, and one need only refer to FIG. 1 and consider the flow restriction that would result if the bearing assembly were turned upside-down.

Figure 7A:
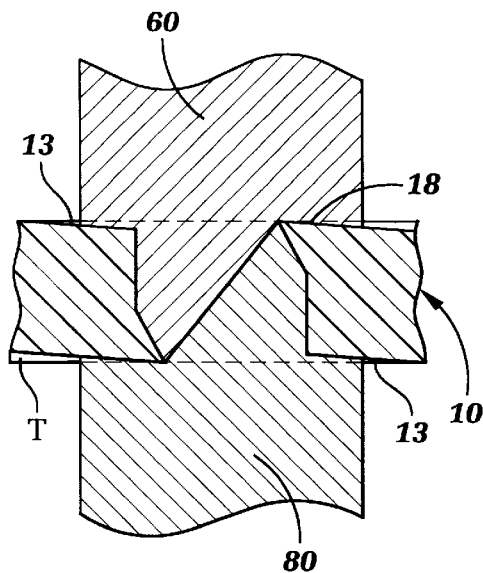
FIG. 7a. is a schematic elevation sectional view of a roller pocket in a roller cage with the molding tool in place.
Figure 7B:
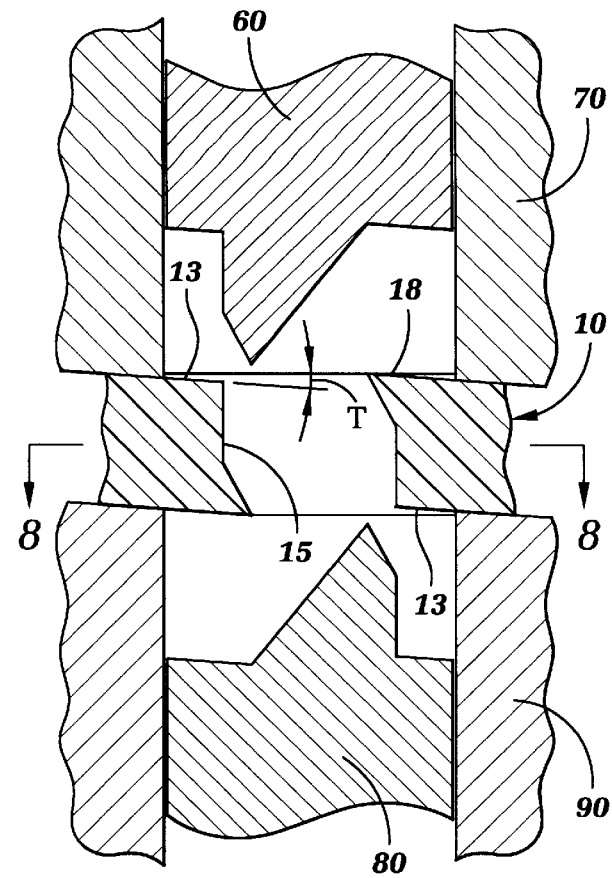
FIG. 7b. is a schematic elevation sectional view of a roller pocket in a roller cage with the molding tool withdrawn from the pocket to illustrate the axial draw molding permitted by the invention.

A method and tooling for molding the cage 10 with the pockets 15, the retainer vanes 18, and the tilted solid portions 13 between the pockets is shown in FIGS. 7a and 7b. Here, the core pins 60, 80 are seen to be reverse images of each other such that they fit together seamlessly and define pockets 15 with laterally reversed features. This provides the sharp edged retainer vanes 18, the straight sidewalls of the pockets, and the tilted solid portions 13 resulting in the faceted first and second faces of the cage 10. The annular form of the cage is provided by the mold body 70, 90, shown only in FIG. 7b, from which the core pins are axially extended and withdrawn to define the pockets. The cavity of the annular mold body is made with a top member 70 and a bottom member 90 both of which have tilted surfaces between the core pins 60, 80 to match with those of the core pins and to blend smoothly to the sharp edges of the retainer vanes. The axial-draw tooling used with this design permits molding with stronger high-temperature polymers than can be used with radial draw tooling, since there is no interference between the tool and the retainer vanes during withdrawal of the tool from the mold.

Figure 8:
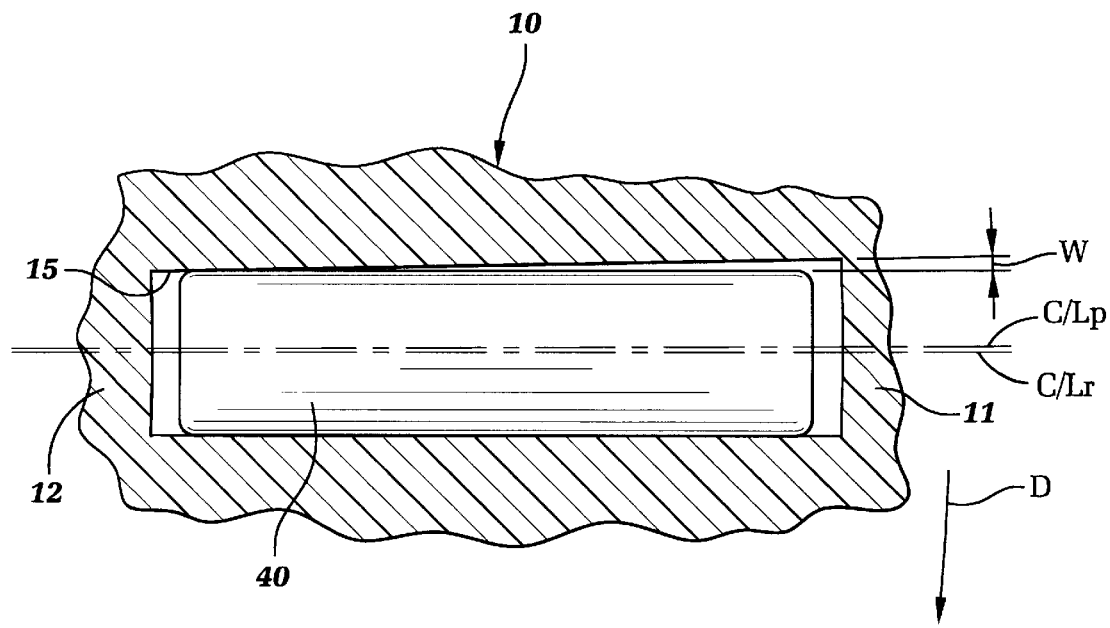
FIG. 8 is a fragmentary schematic sectional plan view of a roller and roller pocket, along line 8—8 of FIG. 7, illustrating further detail of the roller pocket form.

FIG. 8 illustrates the slightly trapezoidal shape of the roller pockets 15, which is preferred in order to provide line contact between the rollers 40 and the cage 10 at the leading edges of the pockets 15. This reduces the uneven pressure and wear between the rollers and the roller pockets of the cage caused by a purely rectangular roller pocket shape. With rectangular pockets, because of the clearance of the pocket 15 around the roller 40; upon acceleration, the rollers tend to drive the pocket sidewalls at their outer ends, as indicated by the divergence between the roller centerline $C/L_r$ and the pocket centerline $C/L_p$, due to the offset of the sidewalls of the pockets 15 from the radii of the cage 10. During deceleration, the pocket sidewalls of the cage 10 also tend to drive the rollers at their outer ends, in which case, the roller centerline would lag the pocket centerline (not illustrated). Thus, both conditions lead to potentially damaging non-uniform loading and stress concentrations within the bearing assembly. This condition is described in U.S. Pat. No. 4,077,683, issued Mar. 7, 1978 and commonly assigned herewith.

The roller bearing made according to the invention provides the advantage of always having a film of lubricant flowing through the roller pockets and over the solid portions of the cage even under overload conditions which deform the races sufficiently to cause them to ride against the inner and/or outer rails of the roller cage. The provision of the notches on the inner and outer radial surfaces of the cage and the recesses on the inner and outer rails at the first and second faces of the cage, respectively, together with the retainer vanes, assures a continuously pumped flow of lubricant through the always open flow path over the cage rails and through the pockets.

Having described the invention, we claim:

1. A roller cage for an axial-thrust bearing in a rotating machine, comprising:

a substantially flat annular body having a first face, a second face, a radially inner surface, and a radially outer surface;

a plurality of radially-arrayed substantially rectangular roller pockets with axially oriented sidewalls and endwalls, said pockets extending between inner and outer rails of said annular body;

and means for directing a flow of lubricant radially through said thrust bearing and axially through said radially arrayed roller pockets during operation of said machine;

wherein the means for directing flow of lubricant radially through said thrust bearing comprises a recess on the inner rail between each roller pocket on the first face, a recess on the outer rail between each roller pocket on the second face of said cage, and a solid portion between each roller pocket, at least part of said solid portion has an axial extent less than the axial extent of said inner and outer rails;

wherein the recesses on the inner rail between each roller pocket at the first face and on the outer rail at the second face are asymmetrically formed to provide a squeegee action such that lubricant flow is directed into otherwise lubricant-starved regions of the bearing.

2. The roller cage of claim 1, further comprising:

means for retaining cylindrical rollers in said roller pockets.

3. The roller cage of claim 2, wherein the means for retaining cylindrical rollers in said roller pockets comprises a single substantially full-length projection on one sidewall of each substantially rectangular pocket at the first face and another single substantially full-length projection diagonally opposite on the other sidewall of each pocket at the second face.

4. The roller cage of claim 1, wherein the means for directing a flow of lubricant axially through said radially arrayed roller pockets during operation of said machine comprises at least one vane member projecting into each said roller pocket from a sidewall at the first face of said body, and at least one vane member projecting into each said roller pocket from a sidewall at the second face diagonally opposite to the vane member at the first face, said vane members also providing for retention of rollers within said pockets.

5. The roller cage of claim 1, further comprising:
a labyrinth seal on said inner rail on said second face and another labyrinth seal on said outer rail on said first face for sealing against an outer race and an inner race, respectively, of said axial thrust bearing.

6. The roller cage of claim 1, further comprising:
a divergence between the sidewalls of said roller pockets and the radius of said cage to provide line contact between the rollers and the sidewalls of said roller pockets during operation of the thrust bearing.

7. An axial-thrust roller bearing for use in a rotating machine, comprising:
inner and outer annular races, said inner race having a substantially cylindrical axially oriented inner wall at its inner edge, and said outer race having a substantially cylindrical axially oriented outer wall at its outer edge, both said races having radially disposed annular surfaces projecting from said cylindrical axially oriented walls;
a plurality of cylindrical roller elements positioned between and bearing against the radially disposed annular surfaces of said inner and outer races;
a cage for retaining said roller elements, said cage comprising a substantially flat annular body having a first face confronting the radially disposed annular surface of the inner race, a second face confronting the radially disposed annular surface of the outer race, a radially inner surface adjacent the axially oriented inner wall of said inner race, a radially outer surface adjacent the axially oriented outer wall of said outer race, and an axial thickness less than the diameter of said roller elements; a plurality of radially-arrayed substantially rectangular roller pockets with axially oriented sidewalls and endwalls, said pockets extending between inner and outer rails of said annular body and separated by inclined solid portions of substantially uniform thickness having leading edges of equal axial extent with the inner and outer rails on the first face and trailing edges of equal axial extent with the inner and outer rails on the second face; and means for direction flow of lubricant across roller/race contact lines during operation of the rotating machine;
wherein the means for directing flow of lubricant across roller/race contact lines comprises a clearance between the cylindrical inner wall of said inner race and the radially disposed annular surface of said outer race; a clearance between the cylindrical outer wall of said outer race and the radially disposed annular surface of said inner race; a recess in the inner rail of the cage at the first face of the cage between each pair of roller pockets and inclined to be substantially contiguous with said solid portion; a recess in the outer rail at the second face of the cage between each pair of roller pockets, each said recess being substantially contiguous with the inclined solid portion, extending to the radially outer surface of said cage.

8. The roller thrust bearing of claim 7, further comprising:
a plurality of notches on the radially inner surface and the radially outer surface of the roller cage, said notches comprising sharp edged axial grooves, at least one edge of which is inclined in a direction of rotation to pump lubricant from the second face of said cage along the radially inner surface and radially outer surface of the cage to the first face of said cage, each said notch of the radially inner surface beginning at the inner rail on the second face and terminating at the approximate center of one of said recesses on the first face of said cage, and each said notch of the radially outer surface beginning at the approximate center of one of said recesses on the second face and terminating at the outer rail of the first face of said cage.

9. The roller cage of claim 7, further comprising:
a labyrinth seal on said inner rail on said second face and another labyrinth seal on said outer rail on said first face for sealing against said outer race and said inner race, respectively, of said axial thrust bearing.

* * * * *